March 31, 1970  H. E. ELLER ET AL  3,504,274
METHOD AND MEANS OF DETECTING GASES HAVING MAGNETIC
SUSCEPTIBILITY AND INCLUDING A FLUID BRIDGE
Filed Jan. 9, 1968
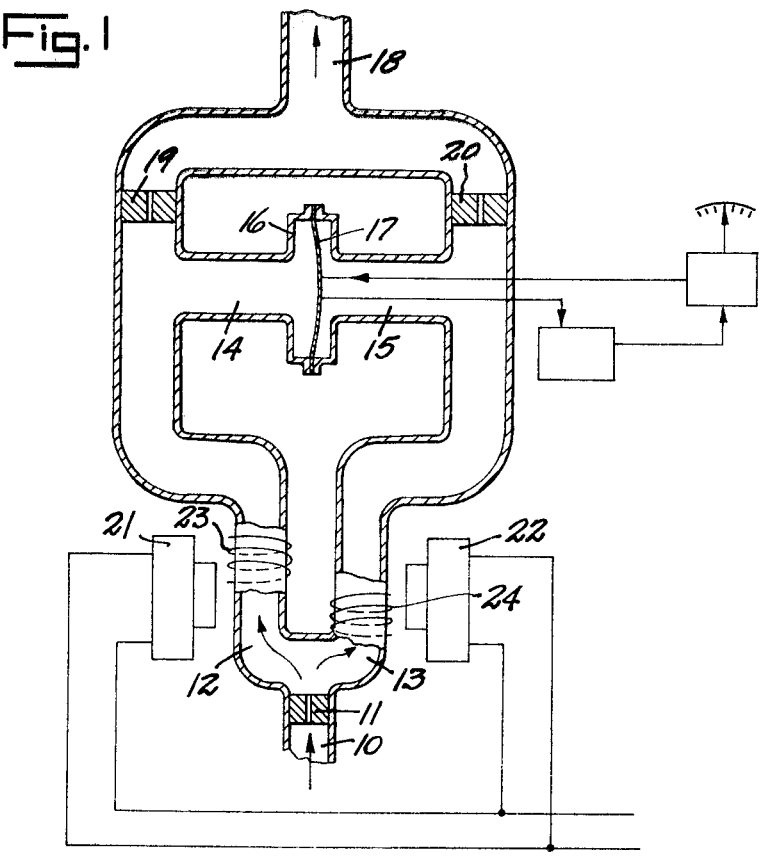
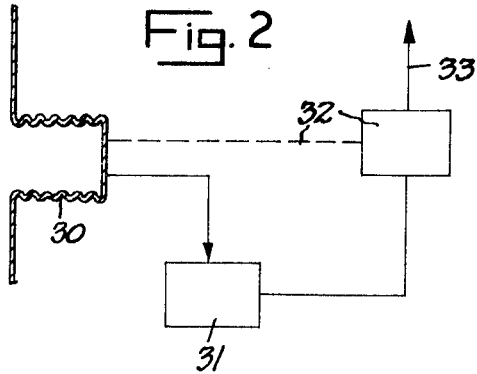
INVENTORS
HAROLD E. ELLER &
HUBERT DRECKMANN
BY
*Eugene C. Knoblock*
ATTORNEY United States Patent Office 3,504,274
Patented Mar. 31, 1970

3,504,274
METHOD AND MEANS OF DETECTING GASES HAVING MAGNETIC SUSCEPTIBILITY AND INCLUDING A FLUID BRIDGE
Harold E. Eller and Hubert Dreckmann, Michigan City, Ind., assignors to The Hays Corporation, Michigan City, Ind.
Filed Jan. 9, 1968, Ser. No. 696,568
Int. Cl. G01r 33/00; G01n 27/72
U.S. Cl. 324—36                    8 Claims

ABSTRACT OF THE DISCLOSURE

A method and means for detecting a gas having magnetic susceptibility wherein magnetic wind pulses of the same magnitude but acting in opposite directions are generated by the conjoint action of an electromagnet energized by alternating current and heating means upon two similar streams of a sample gas, so as to create in said streams simultaneous pulses of different pressures which are measured by differential pressure sensing means.

---

This invention relates to improvements in method and means of detecting gases having magnetic susceptibility, such as oxygen.

Various types of devices have been developed heretofore to utilize the unique magnetic properties of oxygen and other gases having magnetic susceptibility in apparatus for determining the concentration of such a gas in a gas mixture. In one type of prior apparatus commonly referred to as a paramagnetic detector the apparatus measures either the force exerted by a magnetic field upon a volume of subject gas or the pressure exerted by a volume of subject gas attracted to a magnetic field. Examples of paramagnetic detectors are to be found in U.S. Patents 2,416,344; 2,666,893 and 3,026,472. The paramagnetic detectors have one substantial disadvantage in common in that they are affected by the diamagnetism of the background gases and must be compensated for such affects in order to achieve accurate results.

Another prior type of apparatus is known as an inductive detector. Apparatus of this character measures the magnetic permeability of a gas which is related to the magnetic susceptibility of the gas according to:

$$X = 1 + 4Y$$

where X equals permeability and Y equals susceptibility. Examples of inductive detectors are to be found in U.S. Patents 2,467,211; 2,930,970; 3,049,665 and 3,076,929. The inductive detectors of this type, like the paramagnetic detectors, are affected by the diamagnetism of the background gases.

Another type of detector utilizing the magnetic properties of a subject gas is known as a thermal magnetic detector. Thermal magnetic detectors measure pneumatic and/or thermal affects caused by a so-called magnetic wind generated therein and proportional to the gas of magnetic susceptibility. Examples of thermal magnetic detectors are to be found in U.S. Patents 2,603,964; 2,763,151; 2,815,659 and 3,045,474. Most thermal magnetic detectors are not affected by the diamagnetism of the background gases, but they are affected to varying degrees by other physical parameters of background gases, such as the thermal conductivity, the density, the viscosity or the heat capacity of the background gases, or combinations of such parameters. One special type of thermal magnetic detector, shown in German Patent No. 1,181,945 and French Patent No. 1,336,252, is affected by physical parameters such as thermal conductivity, density, viscosity and heat capacity of the gas to only a slight extent, but is affected by the diamagnetism of the background gases.

Another type of prior apparatus may be referred to as a divided path differential pressure detector. Such an apparatus is shown in U.S. Patent No. 3,191,425 and requires the use of moving or rotatable magnets and other structural characteristics which render them complicated and expensive.

It is the primary object of this invention to provide a simple and inexpensive oxygen detector which requires a minimum number of parts to produce highly accurate results which are substantially free from the affects of the properties and parameters of background gases.

A further object is to provide a method of this character wherein a sample gas being measured is divided into two flows or streams in which electromagnets and heating means generate pressure pulses of magnetic winds acting in opposite directions, the pressure differences of which pulses are detected and measured as a function of the amount of a gas having magnetic susceptibility which exists in the gas sample.

A further object is to provide a device of this character wherein magnetic wind generating means in two flow paths acting oppositely include electromagnets and in which a push-pull action of pressure response occurs, the simultaneous application of magnetic wind pulses in the two passages producing adding of the two magnetic winds being generated.

Other objects will be apparent from the following specification.

In the drawing:

FIG. 1 is a schematic view of apparatus constituting an embodiment of this invention.

FIG. 2 is a schematic view of a type of detector usable in the apparatus shown in FIG. 1 in place of the detector illustrated therein.

This invention entails the method of dividing a sample gas into two similar gas flows in each of which the gas flow is subjected to the action of a magnetic wind generator of the type utilizing an electromagnet to periodically produce a magnetic flux field threading the gas flow passage and also utilizing a heater coil for heating gas in the flux field and so oriented relative to the flux field as to cause magnetic winds in the respective flows which act in opposite directions, and then detecting the resulting pressure difference occurring in the two flow paths and produced by said magnetic wind generators.

The above method can be performed by use of apparatus as shown schematically in FIG. 1 wherein the numeral 10 designates the inlet of the apparatus which is connected with a source of the sample gas whose component having magnetic susceptibility is to be measured. The inlet is preferably provided with a restrictor 11, such as an orifice plate or a venturi. A pair of passages 12 and 13 branch from the inlet passage remote from the restrictor 11, said branch passages being similar in cross sectional size, length and shape, and being formed of similar material, such as stainless steel or glass. Lateral passages 14 and 15 communicate with the respective branch passages 12 and 13 intermediate the length thereof at similar points and also communicate with the housing 16 of a pressure detector at opposite sides of a pressure sensing element 17 thereof. The branch passages 12 and 13 communicate with an outlet 18 and each has positioned therein in the same relation one of a pair of restrictors 19 and 20 located between the adjacent one of the lateral passages 14, 15 and the outlet 18. Restrictors 19 and 20 preferably constitute orifice plates or venturis which are similar to each other and preferably are similar to the restrictor 11.

Magnetic wind generating means are provided at each branch passage 12, 13 between the restricted inlet thereof and the lateral passages 14 and 15. Thus an electromagnet 21 energized by an alternating current source is juxtaposed to branch passage 12 to generate a magnetic flux field therein, and a similar electromagnet 22 energized by the same alternating current source is positioned in the same relation to branch passages 13 to generate a pulsating magnetic flux field therein. A heater coil 23 is juxtaposed to the electromagnet 21 to heat the gas flowing through the flux field of electromagnet 21, which coil is positioned to project from the flux field in the direction of the outlet so that a magnetic wind generated by the conjoint action of an electromagnet 21 and the heater coil 23 acts in a direction toward the outlet 18. A heater coil 24 is juxtaposed to electromagnet 22 to heat gas flowing in the passage 13 through the magnetic flux field generated by the electromagnet 22 and is displaced from or projects from the flux field in the direction opposite that of coil 23, so that the magnetic wind generated by the conjoint action of the electromagnet 22 and the heating coil 24 acts in the direction of the inlet. The coils 23 and 24 may be positioned within passages 12 and 13 or may encircle said passages. The magnetic winds produced in the two branch passages 12 and 13 are of equal magnitude but act in opposite directions and are of pulsating type.

As a result of the actions of the pulsating magnetic winds in opposite directions in the two branch passages 12 and 13 pressure impulses of different values are applied to the sensing element 17 of the differential pressure detector 16. The resultant movement of the detecting element 17 can be calibrated to constitute an indication of the percentage of gas of magnetic susceptibility existing within the sample gas. The pressure detector 16, 17 illustrated in FIG. 1 is of the type known as a linear differential pressure transducer.

The pressure pulses produced by the magnetic wind generators occur at the frequency of the alternating current power supply instead of constituting a steady differential pressure as is more common. Among the advantages of this system are: (1) the hysterisis of the sensing mechanism in any A.C. measuring device is less than in a steady state measuring device; and (2) the pulse action simplifies the conversion of the pressure differential into an electrical signal. This apparatus substantially eliminates the unwanted affects of the viscosity of background gases in any shunt existing in the device. The variation in the shunting effect with variation in the viscosity of the sample gas in other devices may have a second order effect on measurements made thereby, which the pulsating pressure applications resulting from alternating current operation in the present device greatly reduce.

A push-pull action occurs within the present device and this permits the magnetic fields acting on the gases in the two branch passages 12 and 13 to be applied simultaneously. This results in avoidance of undesired effects of diamagnetic gases in the device as occur in prior devices, such as shown in French Patent No. 1,336,-252 in which the diamagnetism of the sample gases show up as a pressure pulse. This does not occur in the present alternating current system where such diamagnetic pulses act to cancel each other.

FIG. 2 illustrates a force balancing detector which can be utilized in the apparatus illustrated in FIG. 1 in place of the linear differential pressure detector 16, 17 illustrated in FIG. 1. In this embodiment the pressure sensing detecting element 30 of the differential detector, such as a bellows or a diaphragm, is connected to a transducer 31 which converts the motion of the sensing element 30 into an electrical signal. The transducer signal is amplified and applied to an electrical signal responsive force balancing unit 32 which is connected to the pressure sensing element 30 in a manner to restore the sensing element 30 to a null or balanced position. Force balance unit 32 may include an indicator 33 which is so calibrated as to indicate or measure the percentage of the gas of magnetic susceptibility whose presence causes the magnetic winds which produce the pressure impulses acting on the element 30.

The use of a force balanced pressure detector of the character illustrated in FIG. 2 has advantages over the use of a linear differential pressure detecting device in that (a) it has the inherent high sensitivity of null balanced systems and (b) it minimizes the linearity requirements for the pressure sensing elements.

While the preferred embodiments of the invention have been illustrated and described, it will be understood that changes in the construction and method may be made without departing from the spirit of the invention.

We claim:

1. The method of detecting a gas of magnetic susceptibility contained in a sample gas consisting of the steps of
    directing flow of a sample gas from a source through two similar passages,
    generating at a predetermined point in one passage periodic magnetic wind pulses acting in a direction opposite said gas source,
    generating in the other passage at a point similar to the generating point in the first passage periodic magnetic wind pulses of the same magnitude and occurring at the same time as said first magnetic wind pulses and acting in a direction toward said gas source, and
    detecting the differences of the pressure pulses produced in said passages by said magnetic wind pulses.

2. The method of gas detection defined in claim 1, wherein
    said sample gas flow upstream from said magnetic wind generators is restricted to a predetermined extent and said sample gas flow downstream from said magnetic wind generators is restricted to a predetermined extent.

3. The method of gas detection defined in claim 1, wherein
    the detecting of said pressure pulses includes subjecting the pulses to a movable sensing element having a balance position, transducing the motion of said element into an electrical signal, and transducing said electrical signal into a force applied to rebalance said element.

4. Means for detecting in a sample gas a gas having magnetic susceptibility comprising
    means defining two similar gas flow passages communicating with a source of sample gas,
    means for generating a magnetic wind in one flow passage acting in a direction away from said source,
    means for generating in the other flow passage a magnetic wind of the same magnitude as said first magnetic wind and acting in a direction toward said source,
    said magnetic wind generating means each including an electromagnet energized by an alternating current simultaneously with energization of the other electromagnet and a heater winding adjacent said magnet, and
    means connected to said passages to detect the pressure difference in pressure pulses produced therein by said wind generating means.

5. Gas detecting means as defined in claim 4, wherein
    each gas flow passage discharges to an outlet and a flow restriction means is located upstream from said wind generating means and other flow restriction means is located downstream from said wind generating means and said pressure detecting means.

6. Gas detecting means as defined in claim 5, wherein said detecting means is a linear differential pressure sensor.

7. Gas detecting means as defined in claim 5, wherein said detecting means includes a pressure sensing member having a balance position, a transducer converting movement of said sensing member into an electrical signal, and a force balance unit responsive to said electrical signal for restoring said sensing member to said balance position.

8. Gas detecting means as defined in claim 5, wherein said detecting means is of the null balance type.

References Cited

UNITED STATES PATENTS

| | | | |
|---|---|---|---|
| 3,020,764 | 2/1962 | Joline | 73—407 |
| 3,240,051 | 3/1966 | Lenfant | 324—36 XR |
| 3,302,448 | 2/1967 | Mocker | 73—23 |

ALFRED E. SMITH, Primary Examiner

U.S. Cl. X.R.

73—23